United States Patent
Wang et al.

(10) Patent No.: US 8,654,715 B2
(45) Date of Patent: Feb. 18, 2014

(54) SYSTEMS AND METHODS PROVIDING MOBILE TRANSMIT DIVERSITY

(75) Inventors: Jibing Wang, San Diego, CA (US); Rashid Ahmed Akbar Attar, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 675 days.

(21) Appl. No.: 12/582,514

(22) Filed: Oct. 20, 2009

(65) Prior Publication Data

US 2010/0103877 A1    Apr. 29, 2010

Related U.S. Application Data

(60) Provisional application No. 61/186,124, filed on Jun. 11, 2009, provisional application No. 61/108,352, filed on Oct. 24, 2008.

(51) Int. Cl.
*H04W 4/00* (2009.01)

(52) U.S. Cl.
USPC ......................................... 370/329

(58) Field of Classification Search
USPC ......................................... 370/329
See application file for complete search history.

(56) References Cited

U.S. PATENT DOCUMENTS

| | | | |
|---|---|---|---|
| 6,771,989 B1 | 8/2004 | Katz et al. | |
| 7,062,232 B2 * | 6/2006 | Coan et al. | 455/101 |
| 8,072,915 B1 | 12/2011 | Gutierrez et al. | |
| 8,213,539 B2 | 7/2012 | Zhang et al. | |
| 2002/0122400 A1 | 9/2002 | Vayanos et al. | |
| 2004/0014434 A1 | 1/2004 | Haardt | |
| 2004/0185782 A1 | 9/2004 | Halford et al. | |
| 2005/0181739 A1* | 8/2005 | Krasny et al. | 455/69 |
| 2006/0250941 A1 | 11/2006 | Onggosanusi et al. | |
| 2007/0049218 A1* | 3/2007 | Gorokhov et al. | 455/102 |
| 2007/0142074 A1 | 6/2007 | Black et al. | |
| 2007/0195908 A1 | 8/2007 | Attar et al. | |
| 2007/0223423 A1 | 9/2007 | Kim et al. | |

(Continued)

FOREIGN PATENT DOCUMENTS

| | | |
|---|---|---|
| JP | 2003258770 A | 9/2003 |
| JP | 2004104206 A | 4/2004 |

(Continued)

OTHER PUBLICATIONS

Astely D et al: "LTe: the evolution of mobile broadband" IEEE Communications Magazine, IEEE Service Center, Piscataway, US, vol. 47, No. 4, Apr. 1, 2009, pp. 44-51, XP011281212 ISSN: 0163-6804 Doi: DOI:10.1109/MCOM.2009.4907406 the whole document.

(Continued)

*Primary Examiner* — Kenny Lin
(74) *Attorney, Agent, or Firm* — Jeffrey D. Jacobs

(57) ABSTRACT

A method for use by a remote unit in an Evolution Data Optimized (EVDO) network includes sending transmissions to a base station, each of the transmissions corresponding to a respective one of multiple hypotheses of multiple antenna usage. The method also includes receiving feedback from the base station in response to the transmissions, the feedback being uninformed of multiple antenna usage and using the feedback to select at least one of the hypotheses. The method further includes transmitting data using a multiple-antenna scheme associated with the selected hypotheses.

20 Claims, 8 Drawing Sheets

(56) References Cited

U.S. PATENT DOCUMENTS

| | | |
|---|---|---|
| 2007/0242766 A1 | 10/2007 | Xu et al. |
| 2007/0249296 A1 | 10/2007 | Howard et al. |
| 2008/0062925 A1 | 3/2008 | Mate et al. |
| 2008/0227414 A1* | 9/2008 | Karmi et al. .................. 455/101 |
| 2008/0232403 A1 | 9/2008 | Tsai et al. |
| 2008/0240031 A1 | 10/2008 | Nassiri-Toussi et al. |
| 2008/0260002 A1 | 10/2008 | Zhang et al. |
| 2008/0267108 A1* | 10/2008 | Zhang et al. .................. 370/312 |
| 2010/0080178 A1* | 4/2010 | Cox et al. ...................... 370/329 |
| 2010/0291917 A1 | 11/2010 | Wang et al. |
| 2010/0316154 A1* | 12/2010 | Park et al. ..................... 375/267 |

FOREIGN PATENT DOCUMENTS

| | | |
|---|---|---|
| JP | 2007129752 A | 5/2007 |
| WO | 0077948 A1 | 12/2000 |
| WO | WO03034614 A1 | 4/2003 |
| WO | WO2004023674 A1 | 3/2004 |
| WO | WO2008011320 A2 | 1/2008 |
| WO | WO2009031846 A1 | 3/2009 |

OTHER PUBLICATIONS

International Search Report and Written Opinion—PCT/US2010/030040—International Search Authority, European Patent Office,Jan. 26, 2011.

"International Search Report and Written Opinion—PCT/US2009/061918, International Search Authority —European Patent Office—Dec. 16, 2010."

Magnolia Broadband, "Mobile Transmit Diversity", Aug. 4, 2009, 14 pages.

Taiwan Search Report—TW098136220—TIPO—Aug. 27, 2012.

* cited by examiner

SYSTEMS AND METHODS PROVIDING MOBILE TRANSMIT DIVERSITY

CLAIM OF PRIORITY UNDER 35 U.S.C. §119

The present Application for Patent claims the benefit of U.S. Provisional Application No. 61/186,124 entitled "Mobile Transmit Diversity for EVDO," filed Jun. 11, 2009, and U.S. Provisional Application No. 61/108,352 entitled "Mobile Transmit Diversity for EV—DO," filed Oct. 24, 2008, both of which are assigned to the assignee hereof and hereby expressly incorporated by reference herein.

BACKGROUND

1. Field

The present disclosure relates to techniques using mobile transmit diversity.

2. Background

Currently, there is interest in multiple-antenna systems, such as Multiple Input Multiple Output (MIMO) systems, where two or more devices communicate with each other, each using more than one antenna, in order to enhance data transmission. Some multiple-antenna systems exploit antenna diversity to send the same data on separate signals or to create a phased array to send data. As of result of such transmit diversity, link throughput can be increased.

It would be desirable to be able to support transmit diversity techniques for mobile devices in a high speed wireless data network, such as Evolution Data Optimized (EVDO), High Speed Packet Access (HSPA), Enhanced Data rates for GSM Evolution (EDGE), Long Term Evolution (LTE), and the like. EVDO is a telecommunications standard promulgated by the $3^{rd}$ Generation Partnership Project 2 as part of the CDMA2000 family. EVDO facilitates high data rates in wireless networks.

SUMMARY

According to one embodiment of the disclosure, a method for use by a remote unit in an Evolution Data Optimized (EVDO) network comprises sending a plurality of transmissions to a base station, each of the transmissions corresponding to a respective one of a plurality of hypotheses of multiple antenna usage. The method also includes receiving feedback from the base station in response to the plurality of transmissions, the feedback being uninformed of multiple antenna usage, using the feedback to select at least one of the hypotheses and transmitting data using a multiple-antenna scheme associated with the selected at least one of the hypotheses.

According to one embodiment an Evolution Data Optimized (EVDO)-enabled remote unit comprises means for sending a plurality of transmissions to a base station, each of the transmissions corresponding to a respective one of a plurality of hypotheses of multiple antenna usage. The remote unit also comprises means for receiving feedback from the base station in response to the plurality of transmissions, the feedback being independent of any of the hypotheses, and further comprises means for using the feedback to select at least one of the hypotheses and means for transmitting data using a multiple-antenna scheme associated with the selected at least one of the hypotheses.

In another embodiment, a computer program product tangibly embodying a computer readable medium having computer program logic recorded thereon for use by a remote unit in an Evolution Data Optimized (EVDO) network comprises code sending a plurality of transmissions to a base station, each of the transmissions corresponding to a respective one of a plurality of hypotheses of multiple antenna usage. The computer program product also has code that receives feedback from the base station in response to the plurality of transmissions, the feedback not addressing multiple antenna usage, code that uses the feedback to select at least one of the hypotheses, and code that transmits data using a multiple-antenna scheme associated with the selected at least one of the hypotheses.

In an additional embodiment, a method is performed by a remote unit with a plurality of antennas in a wireless network which comprises cooperating with a base station to select from among a set of steering vectors defining schemes for use of the plurality of antennas, including transmitting to the base station a first pilot using a first steering vector and transmitting to the base station a second pilot using a second steering vector orthogonal to the first steering vector. The method also includes receiving a transmission from the base station in response to the transmissions of the first and second pilots, the transmission from the base station indicating at least one of the schemes for use of the plurality of antennas.

A further embodiment of the disclosure contains a remote unit comprising a plurality of antennas with means for cooperating with a base station to select from among a set of steering vectors defining schemes for use of the plurality of antennas. The cooperating means include means for transmitting to the base station a first pilot and a second pilot, in which the first pilot is transmitted differently than the second pilot, and means for receiving a transmission from the base station in response to the transmissions of the first and second pilots and selecting at least one of the schemes for use of the plurality of antennas in response to the transmission from the base station.

In another embodiment, a computer program product tangibly embodying a computer readable medium having computer program logic recorded thereon for use by a remote unit with a plurality of antennas in a wireless network comprises code that cooperates with a base station to select from among a set of steering vectors defining schemes for use of the plurality of antennas. The computer program product also includes code that transmits to the base station a first pilot using a first steering vector, as well as code that transmits to the base station a second pilot using a second steering vector orthogonal to the first steering vector, and code that receives a transmission from the base station in response to the transmissions of the first and second pilots and selects at least one of the schemes for use of the plurality of antennas in response to the transmission from the base station.

An additional embodiment includes a remote unit cooperating with a base station to select from among a set of steering vectors defining schemes for use of a plurality of antennas which comprises circuitry transmitting to the base station a first pilot and a second pilot on first and second orthogonal steering vectors, respectively, and circuitry receiving a transmission from the base station in response to the transmissions of the first and second pilots, the transmission from the base station indicating at least one of the schemes for use of the plurality of antennas. The unit also includes a beamforming and antenna selection unit selecting at least one of the schemes for use of the plurality of antennas in response to the transmission from the base station.

In yet another embodiment of the disclosure, a method is performed by a base station in a wireless network and comprises cooperating with a remote unit with a plurality of antennas to select from among a set of steering vectors defining schemes for use of the plurality of antennas. The method includes receiving from the base station a first pilot signal transmitted using a first steering vector, receiving from the base station a second pilot signal transmitted using a second steering vector orthogonal to the first steering vector, then selecting at least one of the schemes for use of the plurality of antennas by estimating channel conditions using the transmissions of the first and second pilots, and transmitting the data to the remote unit indicating the selected at least one of the schemes for use of the plurality of antennas.

A further embodiment of the disclosure comprises receiving a transmission from a remote unit and deriving information from the transmission, the information indicating a next steering vector for use by the remote unit. The information is derived without identifying a current steering vector, then transmitting the information to the remote unit.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
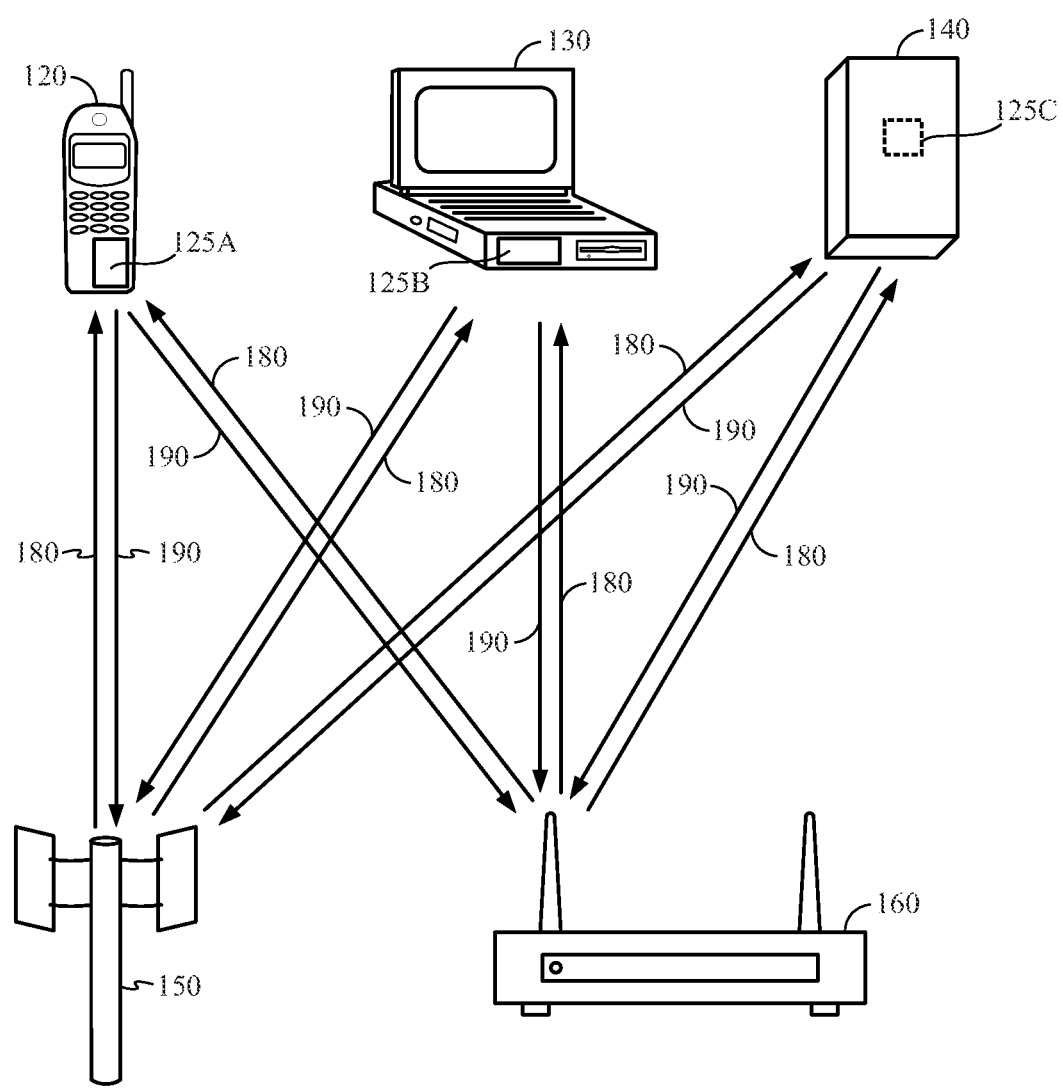
FIG. 1 is a block diagram showing an exemplary wireless communication system in which an embodiment of the disclosure may be advantageously employed.

FIG. 1 shows an exemplary wireless communication system 100 in which an embodiment of the disclosure may be advantageously employed. For purposes of illustration, FIG. 1 shows three remote units 120, 130, and 140 and two base stations 150, 160. It will be recognized that wireless communication systems may have many more remote units and base stations. The remote units 120, 130, and 140 include improved semiconductor processor devices 125A, 125B, and 125C, respectively, which in various embodiments provide functionality for selecting antennas and beamforming based on one or more types of feedback, as discussed further below. The functionality described in more detail below can be implemented using executable code stored to a computer-readable medium integral to, or separate from, the processor devices 125A, 125B, and 125C. FIG. 1 shows the forward link signals 180 from the base stations 150, 160 and the remote units 120, 130, and 140 and the reverse link signals 190 from the remote units 120, 130, and 140 to base stations 150, 160.

In FIG. 1, the remote unit 120 is shown as a mobile telephone, the remote unit 130 is shown as a portable computer, and the remote unit 140 is shown as a computer in a wireless local loop system. For example, the remote units may include mobile devices, such as cell phones, hand-held personal communication systems (PCS) units, portable data units such as personal data assistants; the remote units may also include fixed location data units such as meter reading equipment. Although FIG. 1 illustrates remote units according to the teachings of the disclosure, the disclosure is not limited to these exemplary illustrated units. The disclosure may be suitably employed in any device which includes multiple antennas.

Furthermore, the examples below specifically refer to base stations and remote units in an Evolution Data Optimized (EVDO) network, but the scope of embodiments is not so limited. For instance, many of the features described below are adaptable for use in systems other than EVDO systems, such as systems using High Speed Packet Access (HSPA), Enhanced Data rates for GSM Evolution (EDGE), Long Term Evolution (LTE), and the like.

Figure 2:
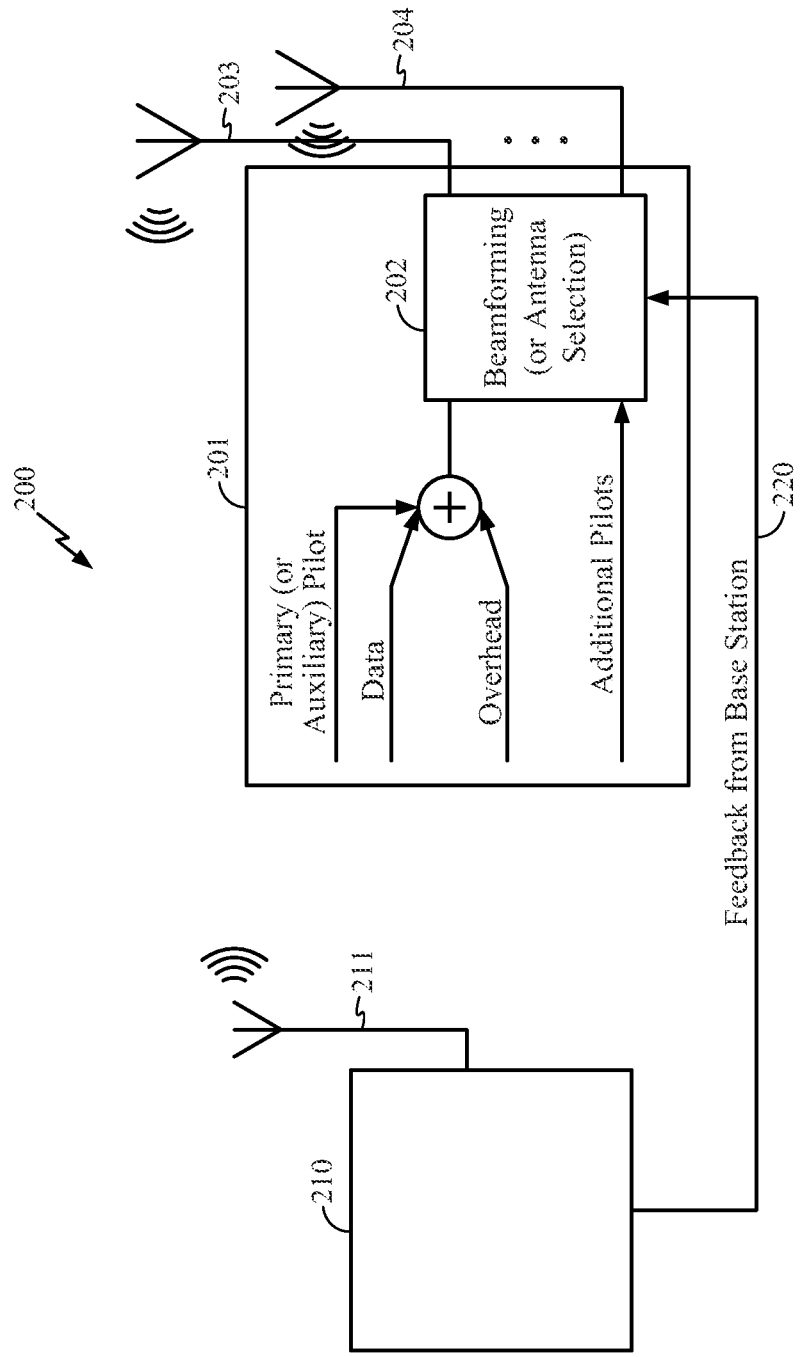
FIG. 2 is an illustration of an exemplary system adapted according to one embodiment of the disclosure.

FIG. 2 is an illustration of an exemplary system 200 adapted according to one embodiment of the disclosure. The system 200 includes a remote unit 201 and a base station 210. The remote unit 201 includes at least two antennas 203, 204, but may be scaled to include three, four, or more antennas (not shown for simplicity). The base station 210 includes at least one antenna 211, but may also be scaled to include additional antennas (not shown).

In one example, the system 200 communicates according to the EVDO standard, where the forward link is time multiplexed, and the reverse link is code division multiplexed. Some transmissions on the reverse link include pilot signals to help in decoding at the base station 210, and some forward link transmissions include feedback 220 to be used by the remote unit 201 to improve communication (to be explained in more detail below).

In the example of FIG. 2, the remote unit 201 includes the beamforming/antenna selection module 202, which dynamically selects among single- or multiple-antenna operating modes. For example, antenna selection can be used to select one of the antennas 203, 204, whereas beamforming can be used to direct a steerable beam. Either or both of beamforming and antenna selection can facilitate improvement in communication quality between the base station 210 and the mobile unit 201 measured by, for example, Bit Error Rate (BER). Collectively, beamforming and antenna selection are referred to herein as "Mobile Transmit Diversity" (MTD) techniques.

Mobile transmit diversity can be adapted for use in EVDO to improve reverse link sector throughput, especially for cell edge users, by adapting the reverse link to better reach the base station 210. Additionally, mobile transmit diversity in EVDO can be used to reduce interference by steering a reverse link beam away from other cells. Furthermore, MTD in EVDO can improve the link budget by selecting a better antenna to use or by improving the link quality through beamforming.

The system 200 can be adapted for use with various mobile transmit diversity techniques, as explained further below. For example, the system 200 can perform open-loop mobile transmit diversity and closed-loop mobile transmit diversity techniques, though various open-loop embodiments may omit the auxiliary pilot. While FIG. 2 shows one base station 210 and one remote unit 201, it is to be understood that a given communication system may be scaled to include multiple base stations and/or multiple remote units, as explained above with respect to FIG. 1.

Figure 3:
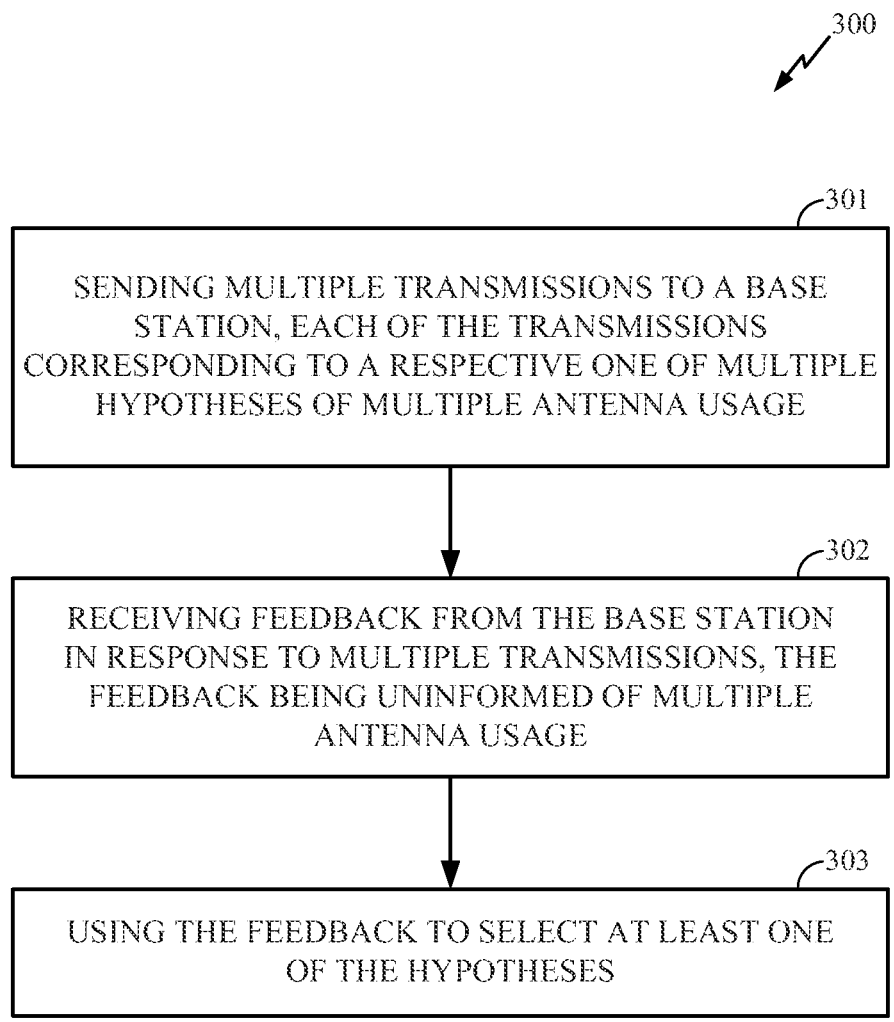
FIG. 3 is an illustration of an exemplary process, adapted according to one embodiment of the disclosure for performing open-loop mobile transmit diversity in the system of FIG. 2.

FIG. 3 is an illustration of a process 300, adapted according to one embodiment of the disclosure for performing open-loop mobile transmit diversity in the system 200. The process 300 may be performed, for example, by a remote unit, such as the remote unit 201 of FIG. 2.

Figure 4:
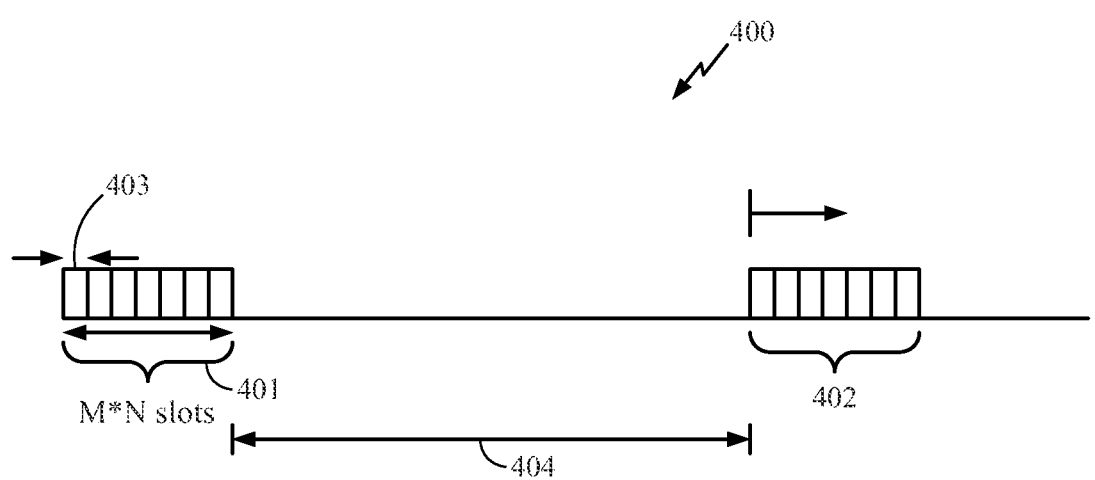
FIG. 4 is an illustration of an exemplary transmission technique for use in the process of FIG. 3.

In block 301, transmissions are sent to a base station. Each of the transmissions correspond to a hypothesis of multiple antenna usage. An example transmission technique is shown in FIG. 4. FIG. 4 shows a timeline 400, which includes two probing periods 401, 402. FIG. 4 assumes an integer number, N, of hypotheses being tested, each of the hypotheses tested for an integer number, M, of slots. Therefore, each probing period 401, 402 lasts for a number of slots M*N.

In this example, a hypothesis refers to a particular antenna selection or beamforming weight/phase combination. For instance, one hypothesis for a remote unit with two antennas might include the vector [0,1], which selects a second antenna but does not use a first antenna. A different hypothesis might include [1,0], which selects the first antenna but not the second. These hypotheses are described further below. In block 301, the remote unit transmits signals using each of the N hypotheses, for M slots each, to the base station. Slots 403 of FIG. 4 represent the N slots for a single hypothesis.

Returning to FIG. 3, in block 302, the remote unit receives feedback from the base station in response to the transmissions during the probing period. In this example, the feedback is uninformed of multiple antenna usage. In other words, the feedback is not based on, nor does it assume, multiple antenna use. One example of feedback that can be used in the process 300 includes power control feedback. For instance, EVDO uses power control feedback from a base station to a remote unit that indicates that the remote unit should increase its transmit pilot power (an "UP" signal) or decrease its pilot transmit power (a "Down" signal). In another example, an EVDO base station sends an ACK signal to a remote unit to acknowledge that a transmission was decoded correctly and sends a NACK signal to acknowledge that a transmission was not decoded correctly. In either instance, neither power control feedback nor ACK/NACK feedback is based on or assumes any multiple antenna use but can be used advantageously by some embodiments to implement open-loop mobile transmit diversity techniques.

In block 303, the feedback is used to select at least one of the hypotheses. For instance, a hypothesis that receives feedback in the form of UP messages may not be as desirable as another hypothesis that receives feedback indicating a stronger signal. In another embodiment, if the remote unit receives n UP messages out of m power control commands, the remote unit switches away from the current hypothesis. Similarly, hypotheses receiving more ACK signals will typically be more desirable than hypotheses receiving more NACK signals. Such criteria can be used by a remote unit to select among hypotheses. Returning to FIG. 4, a selected hypothesis is used in holding period 404 until the next probing period 402 is begun.

While the process 300 is shown as a series of discrete actions, the scope of embodiments is not so limited. Other embodiments may add, omit, rearrange, or modify the actions in the process 300. For instance, some embodiments can dynamically change the number of hypotheses to test, the length of the probing period, and the period between probing periods. Advantages of some open-loop mobile transmit diversity techniques is that they can be implemented using existing inputs at the remote unit, thereby requiring few or no changes to the base station infrastructure or programming.

The number of hypotheses to test, the probing period, and the length of time to use a selected hypothesis before probing again (i.e., holding period) can each be adaptive. For example if a particular hypothesis is not selected for a long period of time, that hypothesis may not be tested again for a while. These values can be set based upon channels and characteristics of the mobile device (e.g., movement speed of the mobile device).

Figure 5:
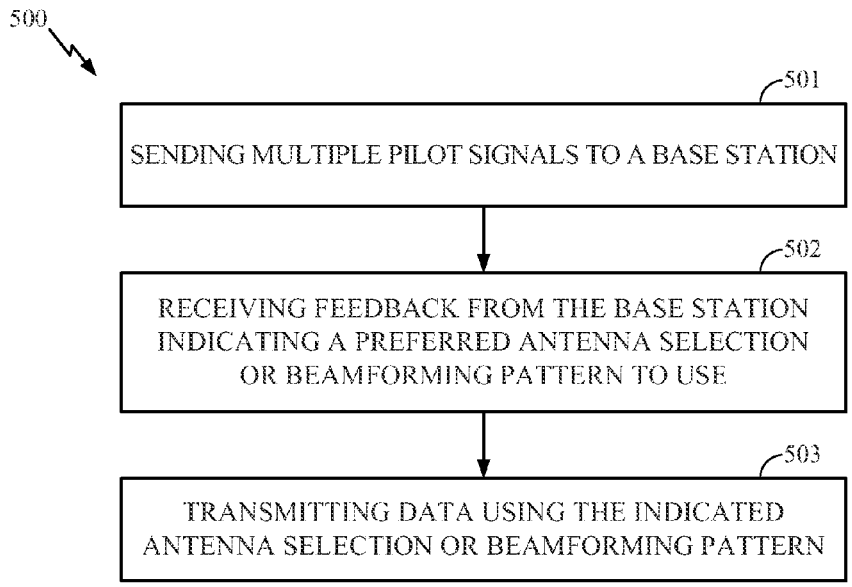
FIG. 5 is an illustration of an exemplary closed-loop mobile transmit diversity process adapted according to one embodiment of the disclosure.

The process 300 is one technique for implementing open-loop mobile transmit diversity in an EVDO system. By contrast, other embodiments employ a closed-loop mobile transmit diversity technique where remote units and base stations cooperate to implement MTD. In the closed-loop examples below, the feedback directly relates to, or assumes, a mobile transmit diversity function. FIG. 5 is an illustration of an exemplary closed-loop mobile transmit diversity process 500 adapted according to one embodiment of the disclosure. The process 500 illustrates a closed-loop mobile transmit diversity process from the point of view of a remote unit.

In block 501, multiple pilot signals are sent to the base station. In block 502, feedback is received from the base station that indicates a preferred antenna selection or beamforming pattern to use. In block 503, the remote unit transmits data using the indicated antenna selection or beamforming pattern. The process is repeated, e.g., every frame, periodically, and/or the like, to account for changing channel conditions. If multiple carriers are employed (e.g., EVDO Rev B), the pilot transmissions and feedback occur for every carrier. Exemplary operations of a remote unit are described in more detail below.

Figure 6:
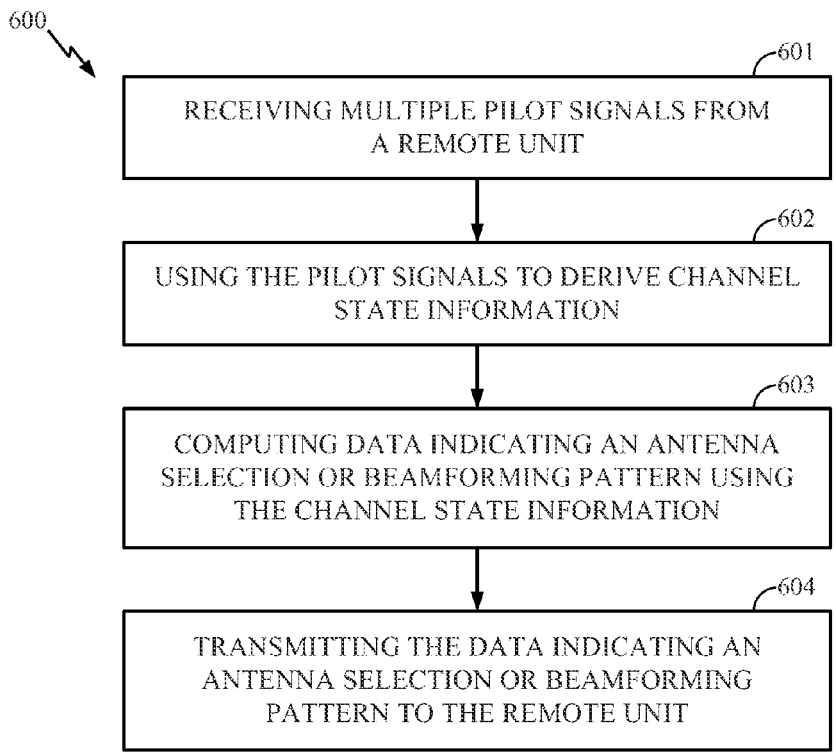
FIG. 6 is an illustration of an exemplary closed-loop mobile transmit diversity process adapted according to one embodiment of the disclosure.

FIG. 6 is an illustration of an exemplary closed-loop mobile transmit diversity process 600 adapted according to one embodiment of the disclosure. The process 600 illustrates a closed-loop mobile transmit diversity process from the point of view of a base station.

In block 601, multiple pilots are received from the remote unit. In block 602, the pilot signals are used to derive channel state information. For instance, Equation (1) shows how to calculate channel state information, where $H_l$ is channel state information for the lth path, $Y_l$ is the received signal for the lth path, and X is the pilot matrix, which is a matrix of steering vectors (vectors defining a particular antenna selection or beam). The pilot matrix is known, and the base station observes Y as it receives the signal.

$$H_l = Y_l X^{-1} \tag{1}$$

In block 603, the base station computes data indicating an antenna selection or beamforming pattern using the channel state information. For instance, in one example, the base station uses the channel state information to calculate which beamforming/antenna selection vector, among a plurality of such vectors, provides the best performance. In block 604, the base station transmits the data indicating the antenna selection or beamforming pattern to the remote unit. The process is repeated, e.g., every frame, periodically, and/or the like, to account for changing channel conditions. Exemplary operations of a base station are described in more detail below.

Figure 7:
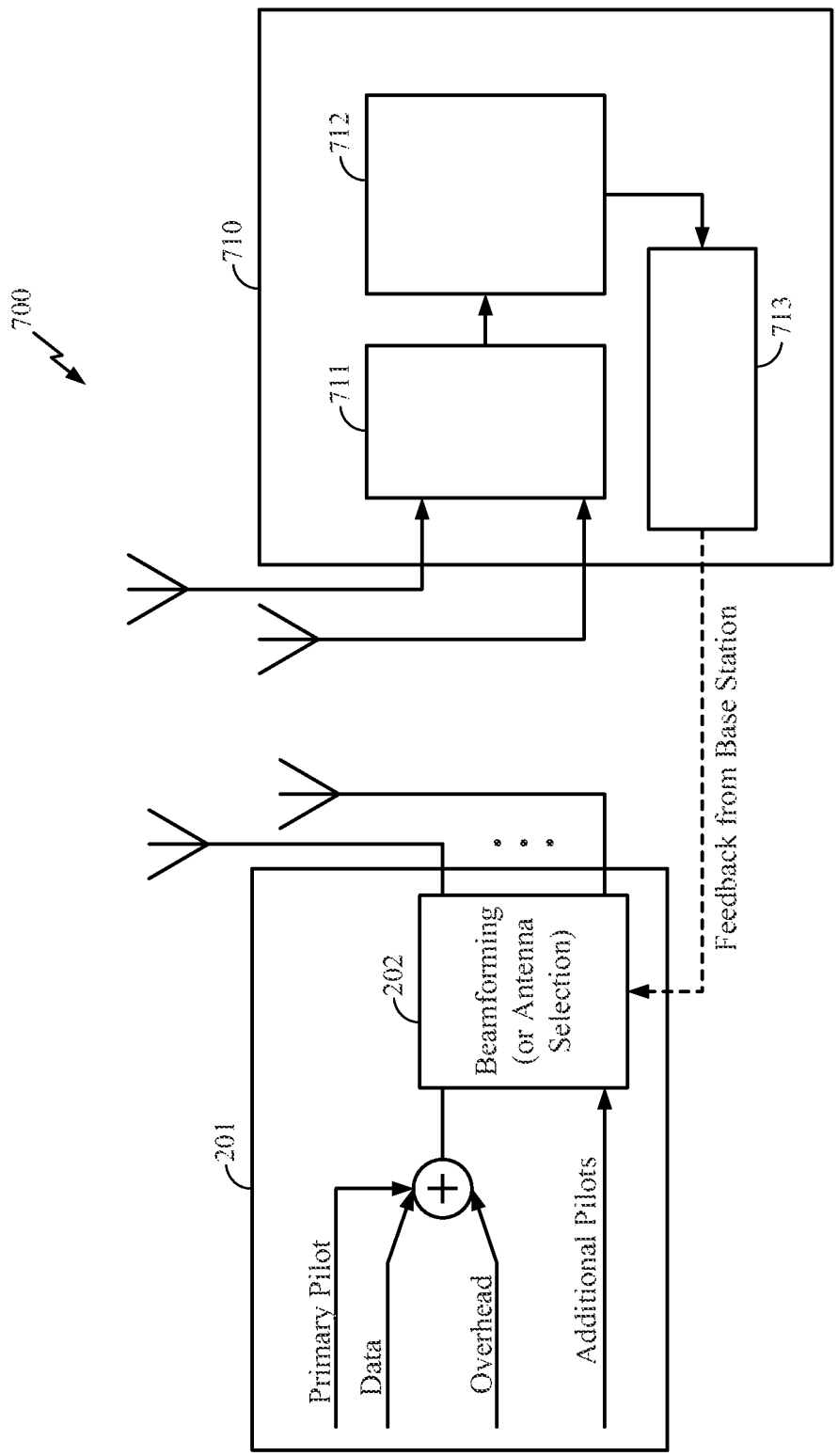
FIG. 7 is an illustration of an exemplary system adapted according to one embodiment of the disclosure and operable to perform the processes of FIGS. 5 and 6.

FIG. 7 is an illustration of an exemplary system 700, adapted according to one embodiment of the disclosure, and operable to perform the processes 500 and 600 of FIGS. 5 and 6. The system 700 includes the remote unit 201 (described above with regard to FIG. 2) and a base station 710. The base station 710 includes a module 711 for estimating channel state information, a module 712 for computing data indicating an antenna selection or beamforming pattern using the channel state information, and a module 713 for transmitting the computed data as feedback to the beamforming/antenna selection module 202 of the remote unit 201.

The exemplary system 700 implements mobile transmit diversity in EVDO by having a defined set of steering vectors, C, given by Equation (2).

$$C = \left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix}, \frac{1}{\sqrt{2}} \begin{bmatrix} 1 \\ j \end{bmatrix}, \frac{1}{\sqrt{2}} \begin{bmatrix} 1 \\ -j \end{bmatrix} \right\} \quad (2)$$

The defined set of steering vectors, C, in this example is referred to as a codebook, and it has four entries. Thus, the feedback from the base station requires two bits. The remote unit 201 has two antennas. Each of the entries is a vector that sets out a weight (power) and a phase for each of the two antennas. For example the [1,1] vector specifies that the second antenna uses the same phase as the first antenna in beamforming. The [1,-1] vector means that the phase of the second antenna is 180 degrees shifted from the first antenna. The imaginary number, j, indicates a relative phase shift of ninety degrees, and a negative j indicates a relative phase shift of 270 degrees. In the codebook illustrated in Equation 2, all entries have the same weight, While not shown herein, the codebook, C, in other embodiments includes antenna selection vectors ([0,1], [1,0]) alternatively to, or in addition to, beamforming vectors. In one embodiment, the base station 710 uses the channel state information to select one of the vectors in the codebook and transmits an indication of the vector to the remote unit as feedback.

Assume that there are L fingers assigned in a RAKE filter, and each finger has a two-by-two pre-whitened Multiple Input Multiple Output (MIMO) channel matrix denoted as $H_l$. If a beamforming weight vector W is used at the remote unit 210, the Signal to Interference Ratio (SINR) seen after the rake combining is given by Equation (3).

$$SINR = \sum_{l=1}^{L} |H_l w|^2 \quad (3)$$
$$= w^H \left[ \sum_{l=1}^{L} H_l^H H_l \right] w$$

A particular beamforming (or antenna selection) vector $W_n$ is selected by the base station using Equation (4), where Equation (4) identifies the vector that maximizes SINR.

$$n = \arg \max_{m=0,1,2,3} w_m^H \left[ \sum_{l=1}^{L} H_l^H H_l \right] w_m \quad (4)$$

In the embodiment shown in FIG. 7, the base station 710 and the remote unit 201 employ techniques to switch on/off a mobile transmit diversity operation or to switch from one mobile transmit diversity operation to another. For instance, one technique performed by the remote unit 201 uses Doppler information as an input, for example, predictor information about the channel state. A high Doppler input is usually associated with high remote unit mobility, and in many embodiments, high remote unit mobility causes calculated channel state information to be outdated very quickly (sometimes as soon as it is calculated). When a high degree of mobility is detected, some embodiments of the remote unit can turn off mobile transmit diversity, according to an assumption that accurate perception of channel qualities is somewhat futile. Doppler-based techniques can be adapted for use in open-loop and closed-loop mobile transmit diversity embodiments.

For a closed-loop mobile transmit diversity embodiment, the number of feedback bits and the update rate of the channel state information can be flexible to account for high and low remote unit mobility. Thus, in one example where there is low mobility, fewer feedback bits and a lower update rate may provide adequate performance, whereas a remote unit with higher mobility may be better served with a greater number of feedback bits and/or a higher update rate. As with the open-loop example above, when high remote unit mobility makes calculating channel state information futile, the mobile transmit diversity can be turned off.

In another example, if it is discerned that the receive power from one antenna of the remote unit is much stronger than from the other antenna for a certain length of time, it can be assumed that one antenna is obstructed (by, for example, a user's hand). In such a scenario, a beamforming mode can be switched to an antenna selection mode to select the unobstructed antenna.

The pilot scheme for the system 700 can be implemented in a variety of ways. In one example, the remote unit 201 sends both a primary pilot and a secondary pilot, with the primary pilot sent on one antenna and the secondary pilot sent on the other antenna. Such an embodiment may be especially useful for antenna selection. Additionally or alternatively, some embodiments use both antennas when sending pilots. Thus, in one example, a remote unit with two antennas transmits a first pilot using a first beamforming vector and transmits a second pilot using a second beamforming vector orthogonal to the first beamforming vector (e.g., at block 501 of FIG. 5). By transmitting both pilots on both antennas, the channel estimation (e.g., at block 602 of FIG. 6) at the base station can be improved by virtue of more averaging. In embodiments that employ more than two antennas at the remote unit, the number of pilots can be scaled accordingly. Furthermore, different pilots can be sent with different long code masks, with different Walsh codes, with different transmission power levels, or with different orthogonal spreading.

The feedback scheme for the system 700 can also be implemented in a variety of ways. For instance, in some embodiments the feedback channel carries indices of selected steering vectors. Additionally or alternatively, the feedback channel can also include quantized information of the channel, such as phase information. In one example, the network assigns an additional Forward Link (FL) Media Access Control (MAC) index to the feedback link. However, in a network with many remote units, MAC indices can be a finite resource; thus some embodiments provide for MAC index reuse. MAC index reuse involves timing several remote units to expect the feedback during different, respective slots. With several remote units looking at different slots for feedback (and each discarding the other slots), the feedback for the different remote units can be assigned the same MAC index.

The principle of reuse, as explained above with respect to the MAC indices, can be applied to channel elements of the pilots as well. In some current EVDO systems, a base station has 512 channel elements and can support, theoretically, 512 users, assuming that each user is assigned one channel element. However, adding more pilots can use more channel elements. One technique employed by some embodiments is to time several remote units to transmit their pilots during different, respective slots on the same channel element. In this manner, some channel elements are reused among a number of different remote units for their respective pilots.

Techniques of reuse for channel elements and for MAC indices can present a trade-off between conservation of indices/channels and at least one performance metric. For instance, in one example, the feedback channel for a given remote unit can be assigned its own MAC index, but as mentioned above, MAC indices are a finite resource. On the other hand, it is noted that in the context of EVDO, some channels are already assigned their own MAC indices. Such channels include the Reverse Power Control (RPC) channel, the DRC LOCK channel (a control channel), and the ARQ channel (the channel carrying ACK and NACK signals). It is possible in some embodiments to puncture an existing channel to add channel state/steering vector indices thereto, thereby reusing the channel's existing MAC index for feedback purposes. However, puncturing a channel to add feedback data thereto may, in some cases, decrease performance of the channel. For instance, in one example, the ARQ channel is punctured so that it carries channel state data and/or steering vector feedback so that the same MAC index is used for different users. However, the puncturing causes the ARQ channel to delay the delivery of some ACK/NACK information, which (in and of itself) causes some performance degradation. In some embodiments, an engineer or the system itself may weight the accompanying performance degradation due to MAC reuse against the accompanying performance increase due to closed-loop MTD and choose a course of action based thereon.

Figure 8:
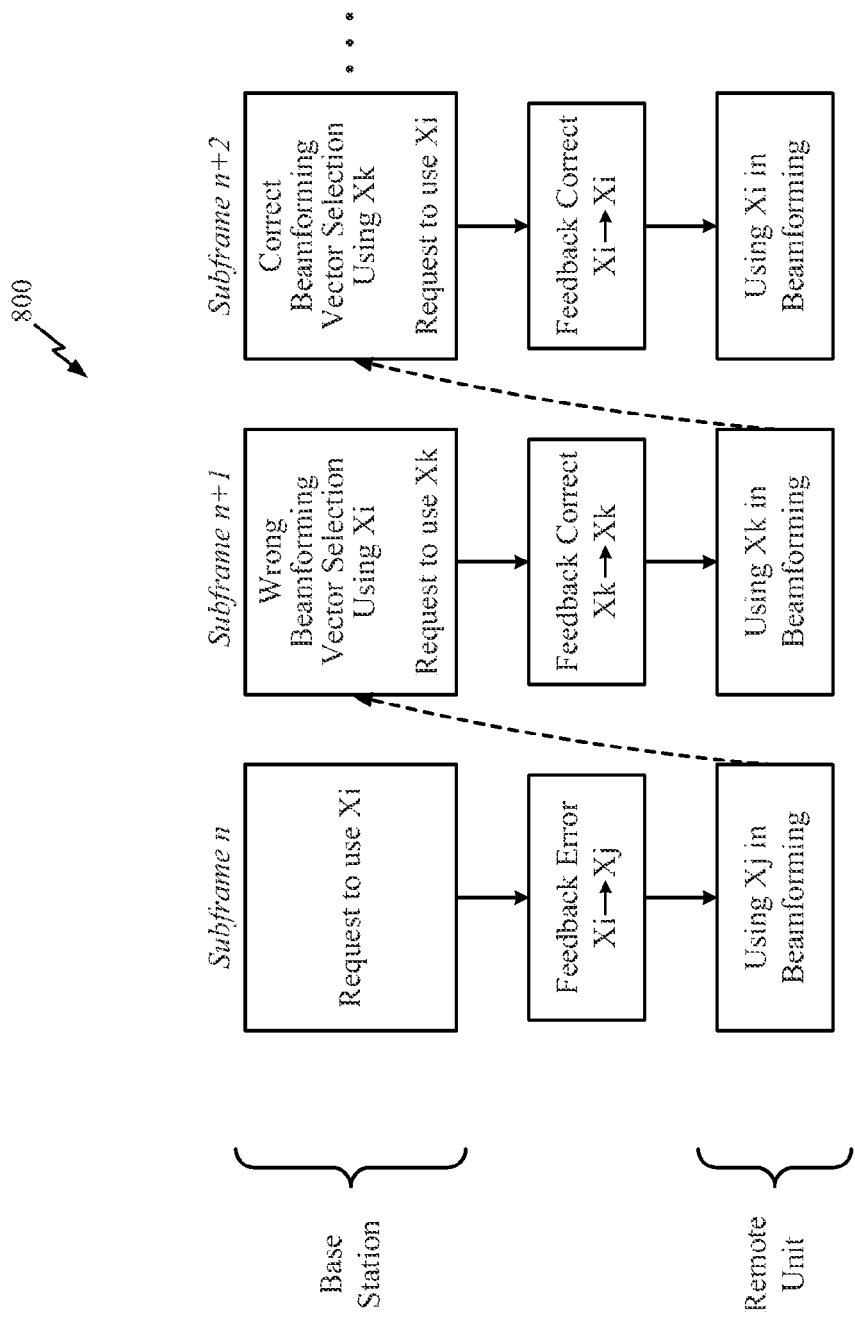
FIG. 8 is an illustration of an exemplary process adapted according to one embodiment of the disclosure.

The substance of the feedback and the calculations performed at the base station can take any of a variety of forms and in some embodiments affects susceptibility to feedback error propagation. FIG. 8 is an illustration of exemplary process 800 adapted according to one embodiment of the disclosure. In subframe n, the base station sends an indication of a particular pilot matrix $X_i$ over the feedback channel to the base station. Once again, the pilot matrix is a matrix of steering vectors that corresponds to a number of antennas at the remote unit. For example, if the remote unit has two antennas, the pilot matrix X has two steering vectors that, in some embodiments, are orthogonal to each other.

In process 800, there is an error in the feedback channel, and the remote unit receives an indication to use pilot matrix $X_j$, rather than $X_i$. The remote unit then sends the next transmission using $X_j$. During subframe n+1, the base station receives the transmission from the remote unit and calculates the channel state information incorrectly. The incorrect channel state information leads the base station to select the next pilot matrix $X_k$, which appears to be the best choice when the incorrect channel state information is used in the calculation of Equation (4) (above). In subframe n+1, in this example, there is no feedback channel error, and the remote unit correctly uses $X_k$.

In subframe n+2, the base station receives the transmission from the remote unit using pilot matrix $X_k$, which the base station expects. The base station then correctly calculates that the pilot matrix $X_l$ should be used in the next subframe n+3 and informs the remote unit accordingly. Process 800 includes propagation of the feedback error at subframe n+1. In other words, two incorrect pilot matrices ($X_j$ and $X_k$) are used because of a single error. Such phenomenon occurs because the base station's selection of a next pilot matrix depends on a current pilot matrix.

Figure 9:
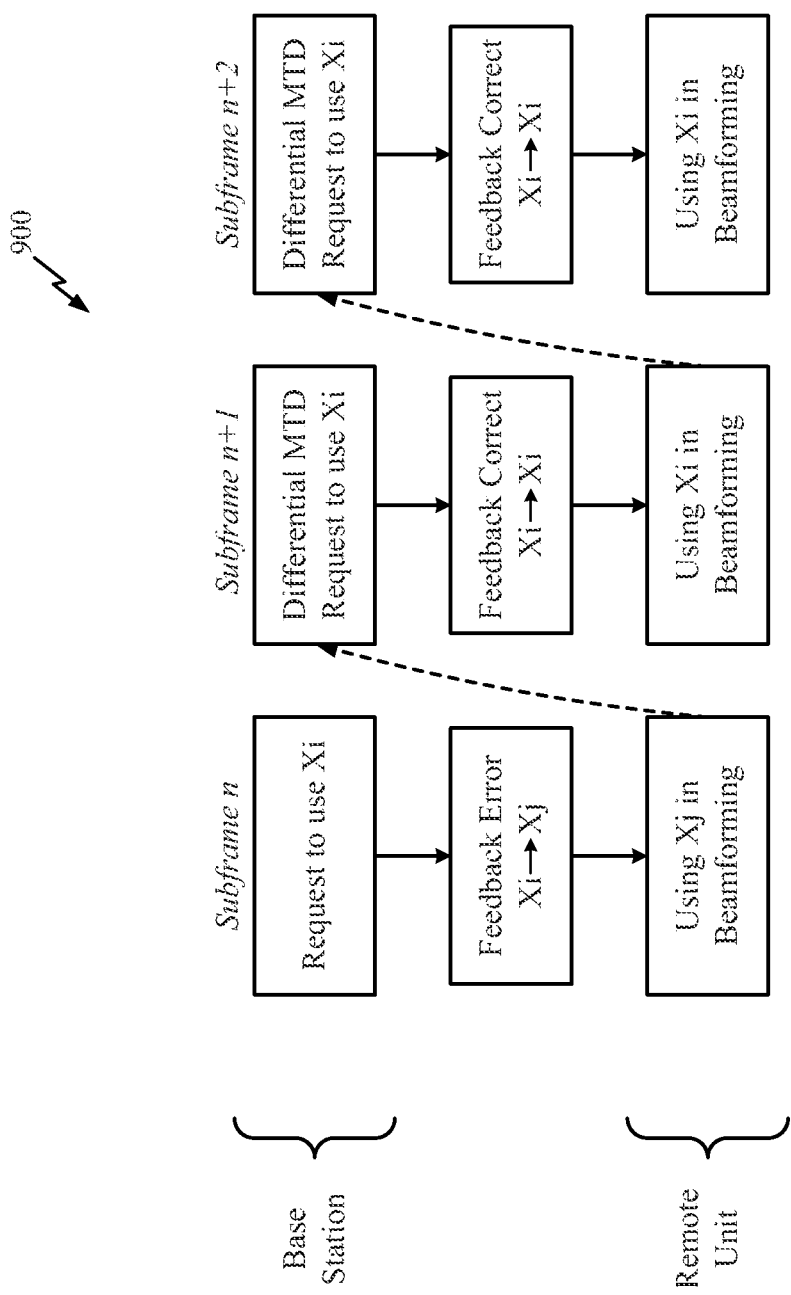
FIG. 9 is an illustration of an exemplary process adapted according to one embodiment of the disclosure.

Some embodiments of the disclosure include techniques to ameliorate the feedback error propagation of process 800 by facilitating the selection of a next pilot matrix irrespective of a present pilot matrix. FIG. 9 is an illustration of exemplary process 900 adapted according to one embodiment of the disclosure. The process 900 is less affected by feedback channel error than is the process 800 of FIG. 8, as explained in more detail below.

Equation (4) shows one way to calculate an index for a steering vector for a pilot matrix. It is noted that in embodiments wherein orthogonal vectors are used for two antennas, if a vector for one antenna is known, the vector for the other antenna is also known. As shown below, Equation (4) can be changed into Equation (5), omitting H and including a new term, z.

$$n = \arg \max_{m=0,1,2,3} z_m^H \left( \sum_{l=1}^{L} Y_l^H Y_l \right) z_m, \text{ where } z_m = X^{-1} w_m \quad (5)$$

As mentioned above, some embodiments use a codebook, which is a set of pre-defined steering vectors from which to select steering vectors. In the embodiment of FIG. 9, each codebook is accompanied by an auxiliary codebook. Two example codebooks (C) and their accompanying auxiliary codebooks ($C_a$) are shown in Table 1:

TABLE 1

| $C = \left\{ \frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix} \right\}$ | $C = \left\{ \begin{bmatrix}1\\0\end{bmatrix}, \frac{1}{\sqrt{2}}\begin{bmatrix}1\\1\end{bmatrix}, \frac{1}{\sqrt{2}}\begin{bmatrix}1\\-1\end{bmatrix}, \begin{bmatrix}0\\1\end{bmatrix} \right\}$ |
|---|---|
| $C_a = \left\{ \begin{bmatrix}1\\0\end{bmatrix}, \frac{1}{2}\begin{bmatrix}1-j\\1+j\end{bmatrix}, \frac{1}{2}\begin{bmatrix}1+j\\1-j\end{bmatrix}, \begin{bmatrix}0\\1\end{bmatrix} \right\}$ | $C_a = C$ |

The entries in the auxiliary codebooks are the values for z, as shown in Equation (6). For a given codebook, the universe of pilot vectors, X, is known, such that for a predefined codebook, the auxiliary codebook can be pre-calculated from the codebook. In a scenario where there is a pre-calculated codebook, a calculation of the next steering vector can be made by a base station without the base station knowing which specific current pilot matrix is used, using Equation (7). In other words, the base station can derive information about the next steering vector without identifying the current steering vector.

$$C_a = \{z_m\} = \{X^{-1} w_m, w_m \in C\} \quad (6)$$

$$n = \arg \max_{z_m \in C_a} z_m^H \left( \sum_{l=1}^{L} Y_l^H Y_l \right) z_m \quad (7)$$

The base station feeds back an identification of the auxiliary codebook entry by, for example, feeding back the auxiliary codebook entry itself or the index of the codebook entry. The remote unit knows the current pilot matrix, X, and the codebook values and computes the beamforming vector to be used in the next subframe using Equation (8).

$$w_n = X z_n \quad (8)$$

Returning to FIG. 9, in subframe n, the base station requests that the remote unit use pilot matrix $X_i$, but a feedback error results in the base station using pilot matrix $X_j$ instead. In subframe n+1, the base station receives the transmission from the remote unit using pilot matrix $X_j$ but correctly calculates $X_i$ to be used in the next subframe. Accordingly, the error from subframe n is not propagated, in contrast to the error in process 800. Thus, an advantage of the embodiment of FIG. 9 is that it is impervious to feedback error propagation.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described herein, or a combination thereof For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The machine or computer readable medium that stores the software code defining the methodologies and functions described herein includes physical computer storage media. A storage medium may be any available medium that can be accessed by the processor. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media. The devices of FIG. 1 can implement hardware, firmware, and/or software implementations as described above and can also implement the tangible storage media integrated with, or separate from, the respective processors.

The methodologies described herein may be implemented by various components depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although specific circuitry has been set forth, it will be appreciated by those skilled in the art that not all of the disclosed circuitry is required to practice the embodiments of the disclosure. Moreover, certain well known circuits have not been described, to maintain focus on the disclosure.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for use by a remote unit in an Evolution Data Optimized (EVDO) network, the method comprising:
    transmitting a plurality of transmissions to a base station from a single wireless device, each of the transmissions corresponding to a respective one of a plurality of hypotheses of multiple antenna usage for the single wireless device;
    receiving feedback from the base station in response to the plurality of transmissions, the feedback being uninformed of multiple antenna usage;
    using the feedback to select at least one of the hypotheses; and
    transmitting data using a multiple-antenna scheme associated with the selected at least one of the hypotheses.

2. The method of claim 1, wherein the feedback comprises power control feedback.

3. The method of claim 1, wherein receiving feedback comprises:
    receiving power control signals indicating whether at least one of the plurality of transmissions should be increased in power.

4. The method of claim 3, wherein using the feedback comprises:
    eliminating at least one of the plurality of hypotheses in response to the received power control signals.

5. The method of claim 1, wherein the plurality of transmissions are sent to the base station during a first period, and wherein the data is transmitted during a second period following the first period.

6. The method of claim 1, wherein the plurality of hypotheses correspond to at least one of:
    antenna selection; and
    beamforming.

7. The method of claim 1, wherein the feedback comprises indications of correct and incorrect decoding at the base station, and wherein using the feedback to select at least one of the hypotheses comprises:
    eliminating at least one of the hypotheses in response to receiving indications of incorrect decoding.

8. The method of claim 1 further comprising:
    discerning a degree of mobility of the remote unit; and
    switching to a single-antenna scheme in response to discerning the degree of mobility.

9. The method of claim 8, wherein discerning the degree of mobility comprises:
    receiving a Doppler input indicating the degree of mobility.

10. The method of claim 1 performed by at least one of a cell phone, a hand-held personal communication systems (PCS) unit, a personal data assistant (PDA), a fixed location data unit, a laptop computer, and a desktop computer.

11. An Evolution Data Optimized (EVDO)-enabled remote unit, the remote unit comprising:
    means for transmitting a plurality of transmissions to a base station from a single wireless device, each of the transmissions corresponding to a respective one of a plurality of hypotheses of multiple antenna usage for the single wireless device;
    means for receiving feedback from the base station in response to the plurality of transmissions, the feedback being independent of any of the hypotheses;
    means for using the feedback to select at least one of the hypotheses; and
    means for transmitting data using a multiple-antenna scheme associated with the selected at least one of the hypotheses.

12. The remote unit of claim 11, wherein the feedback comprises power control feedback.

13. The remote unit of claim 11, wherein the plurality of hypotheses correspond to at least one of:
    antenna selection; and
    beamforming.

14. The remote unit of claim 11, wherein the feedback comprises indications of correct and incorrect decoding at the base station.

15. The remote unit of claim 11 comprising at least one of a cell phone, a hand-held personal communication systems (PCS) unit, a personal data assistant (PDA), a fixed location data unit, a laptop computer, and a desktop computer.

16. A computer program product for wireless communication in a wireless network, the computer program product comprising:
    a non-transitory computer-readable medium having non-transitory program code recorded thereon, the program code comprising:
        program code to transmit a plurality of transmissions to a base station from a single wireless device, each of the transmissions corresponding to a respective one of a plurality of hypotheses of multiple antenna usage for the single wireless device;
        program code to receive feedback from the base station in response to the plurality of transmissions, the feedback not addressing multiple antenna usage;
        program code to select, based at least in part on the feedback, at least one of the hypotheses; and
        program code to transmit data using a multiple-antenna scheme associated with the selected at least one of the hypotheses.

17. The computer program product of claim 16, wherein the feedback comprises power control feedback.

18. The computer program product of claim 16, wherein the program code to receive feedback comprises:
    program code to receive power control signals indicating whether at least one of the plurality of transmissions should be increased in power.

19. The computer program product of claim 16, wherein the feedback comprises indications of correct and incorrect decoding at the base station, and wherein the program code to select at least one of the hypotheses comprises:
    program code to eliminate at least one of the hypotheses in response to receiving indications of incorrect decoding.

20. The computer program product of claim 16 further comprising:
  program code to discern a degree of mobility of the remote unit by receiving a Doppler input; and
  program code to switch to a single-antenna scheme in response to discerning the degree of mobility.

* * * * *